United States Patent [19] [11] 3,928,263
Grant [45] Dec. 23, 1975

[54] PROCESS FOR PRODUCING POLYOLEFIN POWDERS WITH GRINDING AIDS AND POWDER COMPOSITION OF GRINDING AIDS AND POLYOLEFINS

[75] Inventor: Peter M. Grant, Kingsport, Tenn.

[73] Assignee: Eastman Kodak Company, Rochester, N.Y.

[22] Filed: Mar. 29, 1974

[21] Appl. No.: 456,514

[52] U.S. Cl. ................. 260/17 R; 260/873; 241/22; 241/23; 241/DIG. 12; 241/DIG. 14; 241/DIG. 28
[51] Int. Cl.² ..................... B02C 19/18; C08L 1/28
[58] Field of Search ............ 260/17 R, 873, 2.5 HA; 241/22, 23, DIG. 12, DIG. 14, DIG. 28

[56] References Cited
UNITED STATES PATENTS

| | | | |
|---|---|---|---|
| 1,923,383 | 8/1933 | Lundteigen | 241/22 |
| 2,091,297 | 8/1937 | Ximenez | 241/DIG. 12 |
| 2,347,464 | 4/1944 | Cuno | 260/758 |

*Primary Examiner*—Harold D. Anderson
*Assistant Examiner*—Edward Woodberry

[57] ABSTRACT

A powder composition of a crystalline polyolefin material and 5 to 35 percent by weight of a grinding aid that is a dissimilar and incompatible polymeric material with respect to the polyolefin, the polymeric material having a softening point below 450°F. and a greater grindability than the polyolefin, and process for preparing polyolefin powder by introducing a grinding aid into a crystalline polyolefin, as by melt compounding, extruding into pellets and then grinding the polyolefins in the presence of the grinding aid. The product yield in one pass through a grinder is increased significantly over that of a polyolefin that has no such grinding aid, as disclosed herein.

19 Claims, No Drawings

PROCESS FOR PRODUCING POLYOLEFIN POWDERS WITH GRINDING AIDS AND POWDER COMPOSITION OF GRINDING AIDS AND POLYOLEFINS

BACKGROUND OF THE INVENTION

This invention relates to the preparation of polyolefin powders for uses such as in flatting aids for paints, for certain molding processes such as rotational molding, for powdered hot melt adhesives and especially for coating compositions for application to finish products such as appliances; metal furniture; steel plates; fixtures; machinery; equipment; and sheet, strip and coil coatings. More particularly, the invention is directed to the introduction of grinding aids to and in combination with polyolefins as a process for improving the grindability of the polyolefins into powders for such uses mentioned above, and to powder compositions comprising the grinding aids and the polyolefins.

Powders, and especially in powder coating uses as indicated above, have increased and are continuing to increase in importance, in large part due to their relative freedom from pollution since they can be applied without the use of an organic solvent in the instance of powder coatings. Nowaday pollution control legislation has become a most significant driving force ever to affect the industrial coatings industry. Powder coatings are thus rising in importance and are expected to replace gradually the traditional organic solvent based coatings in a number of applications that was previously the province of solvent based systems.

As has generally been known in the art, a wide variety of articles of commerce, such as refrigerators, washing machines, kitchen utensils, steel plates, wall panels and the like can be coated by brushing or spraying the surface of such articles with a solution of a coating material followed by evaporation of the solvent component. Pollution control legislation has therefore been focused in part upon solvent emission. Industry also recognizes that in solvent systems solvent recovery processes are costly.

Over the years other coating techniques have been developed, one of which is to deposit the coating material on the surface of the article in the form of a heat-fusible powder. The powder may contain, in addition to the polymer vehicle, additives such as plasticizers, stabilizers, pigments and the like. Two techniques for applying such powder coatings, for example, are 1) fluidized bed coating, in which a hot object is dipped into fluidized powder, and 2) electrostatic powder spray, in which charged powder is coated on to a cold object and then heated. The powder material is fused into a continuous coating under the influence of heat.

Other powders serve as flatting aids, which are used in paint to reduce the gloss of the paint on the painted surface. The flatting aids serve to produce surface imperfections so that there is less reflection of light to the eyes of the observer. Such aids in powder form are preferably 20 microns or smaller so as to avoid giving a grainy finish to the painted surface.

Still other powders may, in some instances, be used as powdered adhesives for hot melt application. These adhesives are readily distributed in their powdered form over a surface and then fused to present a uniform, thinner adhesive coating. The size range requirements for such powders are found to vary considerably, depending on the circumstances involved.

One of the biggest technical problems in the preparation of powders for whatever purpose has been grinding of the material to reduce the material to powders having the desired particle size. The preferred particle size distribution for fluidized bed powder coatings is relatively coarse in particle size, ranging from 100 to 300 microns. Fine particles are very difficult to manage in fluidized beds because of elutrition and agglomeration. Electrostatic-spray powder coatings, for instance, should be less than 150 microns or preferably in the range of about 20–100 microns to obtain a film thickness of about 2 mils. These indicated particle sizes are needed for optimum utility in the equipment, and to give the coating thicknesses that are usually desired, which is about 5 to 50 mil. for fluidized bed coatings and less than 5 mil. for electrostatic spray coatings. Particle shape, size, and size distribution influence the quality and appearance of the resultant coating. Smaller particles in electrostatic spraying can give thinner coatings. They also accept a higher charge, calculated on the weight, than do the larger particles. The attractive force between the smaller charged particle and the object being coated is greater, and thus, better wrap-around is obtained.

Cryogenic grinding is usually the accepted method of making powdered materials from tough plastics because the act of grinding produces heat, which may tend to melt the plastic. Also, under cryogenic conditions, the plastic material tends to become embrittled. more grindable and thus more readily reduced to powder particle sizes.

Polyolefin materials are tough and difficult to grind, even under cryogenic conditions. For instance; in cryogenically grinding a polyolefin such as poly(propylene-graft-acrylic acid), 15 pounds of liquid nitrogen were required to produce a pound of less than 100 micron powder, which is desirable for an electrostatic spraying operation. In one pass through the grinder, only 20 percent of the material was comminuted to this particular micron size product.

On the other hand, it has been found that by the use of grinding aids, such as are disclosed herein, preferably melt compounded with the polyolefin, such as with a carboxylated crystalline polyolefinic material as poly(propylene-graft-acrylic acid), the product yield in one pass using cryogenic grinding conditions increased from 20 to 60 percent. The powder composition of poly(propylene-graft-acrylic acid) and the grinding aids, when applied as a powder coating, did not impair the appearance or the critical, physical properties of the coating. The melt compounded materials, when applied as coatings, presented a very good appearance; gave excellent flat coatings with excellent adhesion and flexibility, adequate impact strength and surprisingly good solvent resistance and print resistance.

SUMMARY OF THE INVENTION

The invention, therefore, is directed to a process for preparing polyolefin powders by the use of grinding aids and to a powder composition comprising polyolefins with the grinding aids incorporated therewith.

The process involves introducing a grinding aid into a crystalline polyolefin and grinding the polyolefin in the presence of the grinding aid. Preferably, the grinding aids and polyolefins are melt compounded by extrusion or roll milling, pelleted and ground. The grinding aid comprises a dissimilar and incompatible polymeric material having a softening point below 450°F. and a greater grindability than the polyolefin.

The powder composition comprises a crystalline polyolefin and 5 to 35 percent by weight of a dissimilar and incompatible, polymeric material with respect to the polyolefin, the polymeric material having a softening point below 450°F. and a greater grindability than the polyolefin.

The use of about 5 to 35 percent, and preferably 10 to 25 percent by weight, of the grinding aid to the polyolefin has been found to increase the product yield from 20 percent up to about 60 percent in one pass through the cryogenic grinder.

The grinding aids, when used in materials for powder coating use, surprisingly have been found not to significantly adversely affect the physical properties of the power coatings, such as by reducing the solvent resistance, heat resistance, impact strength and softening temperature (print resistance).

While these polymeric grinding aids, as described, are effective, it is surprisingly found that pigments, such as titanium dioxide, which would also be incompatible with the polyolefinic material, when added at up to 35 percent, do not serve to be grinding aids.

Although the grinding aids may be crystalline as well as substantially amorphous, for powder coating use it is preferable that they be substantially amorphous because the added crystalline structure in the final fused coated structure tends to be more brittle.

DESCRIPTION OF THE PREFERRED EMBODIMENT

The invention, therefore, concerns compositions, preferably comprising melt blends of a grinding aid with a polyolefin, the resulting product being significantly more grindable than the polyolefin by itself. The resulting blend thus has improved grindability, and, for instance, with respect to use of the resulting ground powder in powder coatings, gives desirable fused powder coatings. The incorporation of the grinding aid into the polyolefin does not impair the appearance or physical properties of the fused powder coating.

One of the grinding aids found to be operable is cellulose acetate butyrate containing 25 to 55 percent by weight of butyryl and 20 to 1 percent acetyl, and having a viscosity from 0.01 to 10 seconds. Another grinding aid is cellulose acetate propionate containing 39 to 47 percent propionyl and 5 to 1 percent acetyl, and having a viscosity from 0.01 to 10 seconds. Still other grinding aids are those linear polyesters which have the characteristics of being a dissimilar and incompatible polymeric material having a softening point below 450°F. and a greater grindability than the polyolefin.

The grinding aids are preferably melt compounded with the polyolefin to be ground by dry mixing the grinding aid with the polyolefin in pelleted form. The dry mixture is melt compounded as by a melt extruder, followed by pelletizing and grinding, preferably cryogenically grinding as by use of a Bantam Mikro-Pulverizer (hammermill) using liquid nitrogen.

It is thought that the grinding aid, which is an incompatible polymeric material with respect to the polyolefin, forms domains in which there is increased likelihood of crack initiation on grinding. The incompatible materials more readily allow crack propagation into the harder to grind polyolefin material, thus increasing the grindability.

The composition to be melt compounded may comprise a polyolefinic material, a stabilizer for the polyolefinic material, a grinding aid resin, pigments and optionally plasticizers and stabilizers for the grinding aid resin. Alternately, the grinding aid resin may be melt compounded with plasticizers, flow aids and stabilizers prior to melt compounding with the stabilized polyolefinic material. This precompounding of the grinding aid may improve the flow of the powder coating and reduce the "orange peel" appearance.

In this disclosure the term "I.V." as used with the indicated linear polyesters stands for "inherent viscosity," which is measured at 25°C. using 0.5 grams of polymer per 100 milliliters of a solvent composed of 60 volumes of phenol and 40 volumes of tetrachloroethane. The polymer is dissolved at 125°C.

"Viscosity" for cellulose acetate butyrate in this disclosure is determined by ASTM Procedure Designation D-817.

"M.F." stands for "melt flow rate" and is determined by ASTM D-1238.

"M.I." stands for "melt index" and is determined by ASTM D-1238.

This invention will be further illustrated by the following examples although it will be understood that these examples are included merely for purposes of illustration and are not intended to limit the scope of the invention.

EXAMPLE 1

Extruded, chopped pellets of stabilized polypropylene (M.F. 50, density 0.915) are melt compounded with 20 percent by weight of poly(ethylene terephthalate) (I.V. 0.40) by Banbury mixing and roll milling. The resulting material, chopped into pellets requires 2.5 lbs. of liquid nitrogen per lb. of less than 150 micron powder on grinding. The initial pellets (i.e., without grinding aids) of polypropylene require 7 lb. of liquid nitrogen per lb. of less than 150 micron powder under similar cryogenic grinding conditions.

The polypropylene/grinding aid material could also be ground at room temperature while the polypropylene without the grinding aid could only be ground with extreme difficulty.

EXAMPLE 2

Stabilized maleated polypropylene (M.F. 80, Saponification No. 9) is melt compounded with 25 percent by weight of poly(cyclohexylene dimethylene terephthalate) (I.V. 0.35) in an extruder. The extrudate is chopped into pellets and cryogenically ground. The rate of production of less than 100 micron powder is three times the rate for the initial maleated polypropylene (without grinding aid).

EXAMPLE 3

Polyethylene (M.I. 40, density 0.965) is melt compounded with 30 percent by weight of poly(neopentyl terephthalate) (I.V. 0.50) by roll milling. The resulting material, chopped into pellets, requires 3 lb. of liquid nitrogen to grind 1 lb. of less than 150 micron powder. The initial polyethylene (without grinding aids) requires 10 lb. of liquid nitrogen to grind 1 lb. of less than 150 micron powder.

EXAMPLE 4

Polyethylene (M.I. 50, density 0.910) is melt-compounded with 30 percent by weight cellulose acetate propionate (I.V. 0.7 in acetone containing 3 percent acetyl, 44 percent propionyl) by roll milling. The resulting material, chopped into pellets, requires 5 lb. of liquid nitrogen to grind 1 lb. of less than 150 micron powder. The initial polyethylene pellets (without grinding aids) require more than 20 lb. of liquid nitrogen to grind 1 lb. of less than 150 micron powder.

EXAMPLE 5

Stabilized poly(ethylene graft-acrylic acid) (M.I. 30, density 0.963, Saponification No. 6) is melt-compounded with 20 percent by weight poly(60 mole percent ethylene, 40 percent neopentyl terephthalate) (inherent viscosity 0.40) by coextrusion. The chopped pellets require 4 lb. of liquid nitrogen to grind 1 lb. of less than 150 micron powder. The initial poly(ethylene graft-acrylic acid) pellets require 10 lb. of liquid nitrogen to grind 1 lb. of less than 150 micron powder.

EXAMPLE 6 (Control without grinding aid)

Stabilized poly(propylene graft-acrylic acid) (M.F. 75, Saponification No. 5) is melt compounded and extruded into pellets. On one pass through a cryogenic grinding procedure 20 percent of the material is reduced to less than 100 micron powder.

EXAMPLE 7

Stabilized poly(propylene graft-acrylic acid) (M.F. 75, Saponification No. 5) is mixed with a grinding aid comprised of 15 percent by weight of a linear polyester prepared from isophthalic acid, terephthalic acid and cyclohexylene dimethanol and formulated as described in U.S. Pat. No. 3,763,062 to Hood et al. The two materials are melt compounded and extruded into pellets. On one pass through a cryogenic grinding procedure 38 percent of the material is reduced to less than 100 micron powder.

EXAMPLE 8

A melt compounded material is prepared as described in Example 7 except that 25 weight percent of the linear polyester is employed. On one pass through the cryogenic grinding procedure 52 percent of the material is reduced to less than 100 micron powder.

EXAMPLE 9

A melt compounded material comprised of the polyolefin described in Example 6 and 20 percent by weight of a linear polyester prepared from 60 mole percent isophthalic acid, 40 mole percent terephthalic acid and cyclohexylene dimethanol (I.V. 0.6). On one pass of the pellets through a cryogenic grinding procedure 30 percent of the material was reduced to less than 100 micron powder.

EXAMPLE 10

A melt compounded material comprised of the polyolefin described in Example 6 and 15 percent by weight of cellulose acetate butyrate that is stabilized and plasticized, the cellulose acetate butyrate having 13.5 percent acetyl, 37 percent butyryl and 2 percent hydroxyl, and a viscosity from 17–28 seconds. On one pass through a cryogenic grinding procedure 38 percent of the material was reduced to less than 100 micron powder.

EXAMPLE 11

A melt compounded material comprised of the polyolefin described in Example 6 and 25 percent by weight of cellulose acetate butyrate that is stabilized and plasticized, the cellulose acetate butyrate having 13.5 percent acetyl, 37 percent butyryl and 1.5 percent hydroxyl, and a viscosity from 0.3 to 0.5 seconds. On one pass through a cryogenic grinder procedure 62 percent of the material was reduced to less than 100 micron powder.

EXAMPLE 12

A melt compounded material as described in Example 11 except that there is 20 percent by weight of the grinding aid and the grinding aid is not stabilized and plasticized. On one pass through the cryogenic grinding procedure 54 percent of the material was reduced to less than 100 micron powder.

Although the invention has been described in considerable detail with particular reference to certain preferred embodiments thereof, variations and modifications can be effected within the spirit and scope of the invention.

I claim:

1. A process for preparing polyolefin powders which comprises introducing a grinding aid into a crystalline polyolefin by melt compounding the grinding aid together with the crystalline polyolefin, extruding into pelleted form and grinding the pellets to form said polyolefin powders, the introduced grinding aid being a dissimilar and incompatible polymeric material having a softening point below 450°F. and a greater grindability than said polyolefin.

2. A process for preparing polyolefin powders as defined in claim 1, said pellets being ground under cryogenic conditions.

3. A process for preparing polyolefin powders according to claim 1 wherein the polyolefin is a member selected from the group consisting of crystalline polyolefins or carboxylated crystalline polyolefins.

4. A process for preparing polyolefin powders according to claim 1 wherein the introduced grinding aid is a member selected from the group consisting of linear polyesters.

5. A process for preparing polyolefin powders according to claim 1 wherein the introduced grinding aid is a member selected from the group consisting of cellulose acetate esters.

6. A process for preparing polyolefin powders according to claim 5 wherein the introduced grinding aid is cellulose acetate butyrate having 25 to 55 percent butyryl and 20 to 1 percent acetyl and a viscosity from 0.01 to 10 seconds.

7. A process for preparing polyolefin powders according to claim 5 wherein the introduced grinding aid is cellulose acetate propionate having 39–47 percent propionyl and 5 to 1 percent acetyl and a viscosity from 0.01 to 10 seconds.

8. A process for preparing polyolefin powders according to claim 3 wherein the carboxylated crystalline polyolefin is poly(propylenegraft-acrylic acid).

9. A powder composition comprising a crystalline polyolefin and 5 to 35 percent by weight of a grinding aid having been introduced in the crystalline polyolefin by melt compounding, said grinding aid being a dissimilar and incompatible, polymeric material with respect to said polyolefin and having a softening point below 450°F. and a greater grindability than said polyolefin.

10. A powder composition as defined in claim 9, the composition comprising 10 to 25 percent by weight of said grinding aid.

11. A powder composition as defined in claim 9, the polyolefin being a member selected from the group consisting of crystalline polyolefins or carboxylated crystalline polyolefins.

12. A powder composition as defined in claim 9 wherein said grinding aid is a member selected from the group consisting of linear polyesters.

13. A powder composition as defined in claim 9 wherein said grinding aid is a member selected from the group of cellulose acetate esters.

14. A powder composition as defined in claim 13 wherein said grinding aid is cellulose acetate butyrate having 25 to 55 percent butyryl and 20 to 1 percent acetyl, and a viscosity from 0.01 to 10 seconds.

15. A powder composition as defined in claim 13 wherein said grinding aid is cellulose acetate propionate having 39–47 percent propionyl and 5 to 1 percent acetyl, and a viscosity from 0.01 to 10 seconds.

16. A powder composition as defined in claim 11 wherein said carboxylated crystalline polyolefin is poly(propylene-graft-acrylic acid).

17. A powder composition as defined in claim 13 wherein said grinding aid is cellulose acetate butyrate having 25 to 55 percent butyryl and 20 to 1 percent acetyl, and a viscosity from 0.01 to 10 seconds.

18. A powder composition as defined in claim 13 wherein said grinding aid is cellulose acetate propionate having 39–47 percent propionyl and 5 to 1 percent acetyl, and a viscosity from 0.01 to 10 seconds.

19. A powder composition as defined in claim 9 wherein said grinding aid is substantially amorphous.

* * * * *